US008693643B2

(12) United States Patent
Mikan et al.

(10) Patent No.: US 8,693,643 B2
(45) Date of Patent: Apr. 8, 2014

(54) INTEGRATING VISUAL VOICEMAIL WITHIN A THREADED COMMUNICATION ENVIRONMENT

(75) Inventors: Jeffrey Mikan, Atlanta, GA (US); Cheryl Lockett, Austin, TX (US); Justin McNamara, Atlanta, GA (US); Simon Richardson, Alpharetta, GA (US); Marco Schneider, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 153 days.

(21) Appl. No.: 13/297,996

(22) Filed: Nov. 16, 2011

(65) Prior Publication Data

US 2013/0121481 A1    May 16, 2013

(51) Int. Cl.
*H04M 1/64* (2006.01)

(52) U.S. Cl.
USPC ... 379/70; 379/88.13; 379/88.23; 379/215.01

(58) Field of Classification Search
USPC ............... 379/88.01, 88.14, 67.1–70, 80, 85, 379/88.11–88.13, 88.17, 88.18, 88.22, 379/88.23, 93.35, 142.08, 215.01; 715/752; 345/173
See application file for complete search history.

(56) References Cited

U.S. PATENT DOCUMENTS 6,639,972 B1 * 10/2003 Cannon et al. ............. 379/88.18
7,257,403 B2   8/2007 Nikkelen 2010/0041404 A1   2/2010 Kim et al.
2011/0254800 A1 * 10/2011 Anzures et al. ............... 345/173
2013/0024780 A1 *  1/2013 Sutedja et al. ............... 715/752

OTHER PUBLICATIONS

AT&T, "Access or Retrieve Visual Voicemail (VVM) Messages with iPhone" Last accessed Feb. 29, 2012, 5 pages.
Youmail Inc. "Easy Voicemail Sharing", 2006-2011, Last accessed Feb. 29, 2012, 1 page.
Youmail Inc. "Voice-To-Text Transcriptions", 2006-2011, Last accessed Feb. 29, 2012, 1 page.
Verizon Wireless "Visual Voice Mail From Verizon Wireless Gives Customers a New Way to Manage Their Messages", Aug. 11, 2008, Last accessed Feb. 29, 2012, 2 pageS.

* cited by examiner

*Primary Examiner* — Md S Elahee
(74) *Attorney, Agent, or Firm* — Amin, Turocy & Watson, LLP

(57) ABSTRACT

Apparatus, methods and computer-readable storage media for integrating visual voicemail within a threaded communication environment are presented herein. A method can include: displaying, via an interface, a thread of messaging content; receiving a visual voicemail; and integrating a display of the visual voicemail within the thread of messaging content. The method can further include generating sound based on a communication included in the visual voicemail, in response to receiving an input via the interface. Further, the method can include integrating the display of the visual voicemail within a multi-modal conversation thread. Furthermore, the thread of messaging can be included in an instant messaging window including SMS and/or MMS messages. Moreover, the display of the visual voicemail can be embedded within a social media based interface. The method can further include receiving a transcription of the visual voicemail; and displaying the transcription within the thread of messaging content.

20 Claims, 12 Drawing Sheets

INTEGRATING VISUAL VOICEMAIL WITHIN A THREADED COMMUNICATION ENVIRONMENT

TECHNICAL FIELD

This disclosure relates generally to integrating visual voicemail within a threaded communication environment.

BACKGROUND

Wireless devices, e.g., cellular based devices, are ubiquitous; and various types of communication can be facilitated with such devices. However, conventional wireless device technologies do not provide for effective voice call messaging within a threaded communication environment.

The above-described deficiencies of today's wireless communication technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject innovations. Its sole purpose is to present some concepts of the disclosed subject matter in a simplified form as a prelude to the more detailed description presented later.

Conventional wireless communication technologies do not provide for effective voice call messaging within a threaded communication environment. To correct for this and other drawbacks of conventional wireless communication technologies, various systems, methods, and apparatus described herein provide for integrating visual voicemail within a threaded communication environment. For example, a method can display, via an interface of a communication device, a thread of messaging content. In one example, the thread of messaging content can include disparate communication modalities, e.g., text, audio, image(s), video, etc. In another example, the method can order, thread, display, etc. the thread of messaging content (as threaded messaging content) in a chronological order according to times that respective messages of the messaging content are sent by and/or received at a communication device.

For example, most recently sent and/or received messaging content can be displayed at a bottom of the threaded messaging content to enable an associated recipient to follow a history of the threaded messaging content (or conversation thread).

In one example, the method can integrate the threaded messaging content within a multi-modal conversation thread including, e.g., text, audio, images, video, etc. associated with, e.g., a cloud-based computing environment, a conversation space, a social media environment associated with a social graph, a chat based interface, etc. In another example, the method can integrate the threaded messaging content within an instant messaging window including a message service message, e.g., a short message service (SMS) message, a multimedia message service (MMS) message.

In another example, the method can receive messaging content including a visual voicemail that is associated with a phone call that is directed to or received at the communication device. For example, the method can determine that the phone call and/or voicemail is being initiated. Further, the method can display, integrate, etc. the visual voicemail within the threaded messaging content in response to the phone call and/or voicemail being initiated.

In an example, the method can generate sound, audio, etc. based on a communication, e.g., a voicemail, a message, etc. that is associated with the visual voicemail. For example, the method can detect, via an input interface of the communication device, a selection event that is associated with an element, e.g., icon, symbol, etc. of the visual voicemail that is displayed within the threaded messaging content. Further, the method can intercept, or join, the phone call while the voicemail is being recorded; listen to the voicemail while it is being recorded, etc. in response to detecting the selection event.

In one example, the method can receive, or generate, a transcription of the visual voicemail. Further, the method can display, e.g., via a pop-up window, etc. the transcription of the visual voicemail within the threaded messaging content.

In another example, the method can record, via the input interface, sound to obtain audio associated with an other visual voicemail. Further, the method can integrate a display of the other visual voicemail within the threaded messaging content, e.g., in response to the other visual voicemail being recorded during a phone call being made, initiated, etc. from the communication device.

In yet another example, the method can receive multimedia content, e.g., an image, a video, music, etc. and integrate, e.g., a symbol, an icon, etc. that is associated with the multimedia content within the threaded messaging content. Further, the method can display, playback, etc. such multimedia content upon detecting, via the input interface of the communication device, a selection event associated with the symbol, the icon, etc.

In another example, the method can receive a voice note, and integrate a display of the voice note within the threaded messaging content. For example, the voice note can include a recorded message that can be communicated, sent, transmitted, etc. between one or more communication devices without initiating a phone call. In yet another example, the method can generate sound, audio, etc. based on the recorded message. For example, the method can detect, via the input interface of the communication device, a selection event that is associated with an icon of the voice note that is displayed within the threaded messaging content. As such, the method can generate audio of the voice note upon detecting the selection event.

In one example, the method can receive a transcription of the voice note, and display the transcription of the voice note within the threaded messaging content.

In another example, the method can record, via the input interface, sound to obtain an other voice note. Further, the method can send the other voice note to one or more recipients, without initiating phone call(s), and integrate a display of the other voice note within the threaded messaging content.

In yet another example, a computer-readable storage medium can include instructions that, in response to execution, cause a computing device to perform operations including displaying a threaded conversation; receiving a visual voicemail; and including the visual voicemail in the threaded conversation.

In one example, the operations can further include generating, based on a first input, sound based on a message included in the visual voicemail. Further, the operations can include intercepting, based on a second input, a communication associated with the visual voicemail.

In an example, an apparatus can include an interface component configured to display a conversation thread. Further, the apparatus can include a messaging component configured to: receive a visual voicemail, and include the visual voicemail within the conversation thread.

In another example, the interface component can be further configured to generate, in response to detecting a first selection, audio based on a communication included in the visual voicemail.

In yet another example, the interface component can be further configured to intercept, in response to detecting a second selection, a call associated with the visual voicemail.

Aspects, features, and/or advantages of the disclosed subject matter can be exploited in substantially any wireless telecommunication or radio technology, e.g., wireless fidelity (Wi-Fi™); Bluetooth™, Worldwide Interoperability for Microwave Access (WiMAX™); Enhanced General Packet Radio Service (Enhanced GPRS); Third Generation Partnership Project (3GPP) Long Term Evolution (LTE™); Third Generation Partnership Project 2 (3GPP2); Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); LTE™ Advanced (LTE-A), Global System for Mobile Communication (GSM), Near Field Communication (NFC), Wibree, Wi-Fi Direct™, etc.

Additionally, one or more embodiments described herein can include legacy telecommunication technologies, e.g., plain old telephone service (POTS). Further, selections of a radio technology, or radio access technology, can include second generation (2G), third generation (3G), and fourth generation (4G) evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller, wireless access point (AP), etc.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
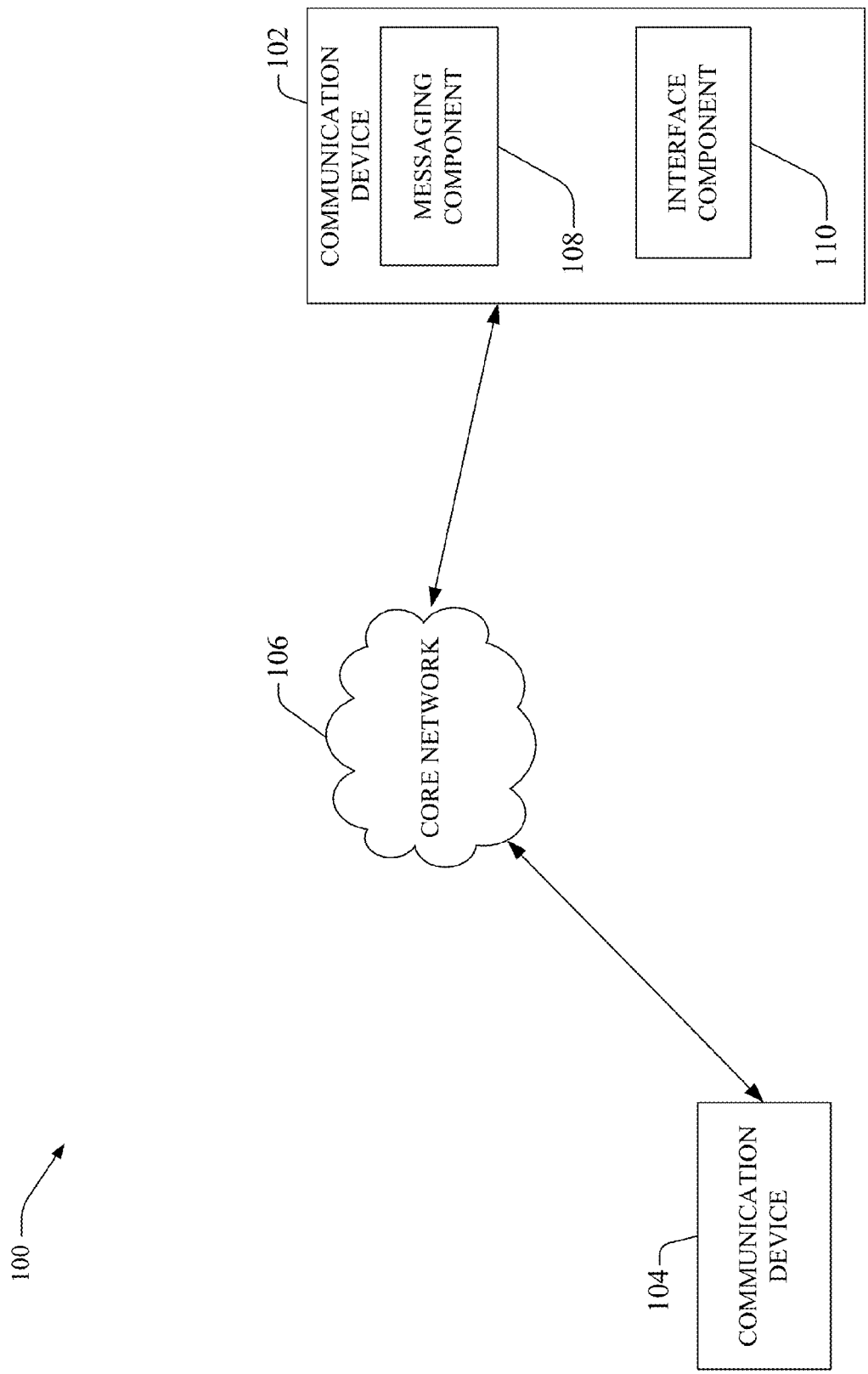
FIG. 1 illustrates a block diagram of a communication environment, in accordance with various embodiments described herein.

Various non-limiting embodiments of systems, methods, and apparatus are provided for integrating visual voicemail within a threaded communication environment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As used in this application, the terms "component," "module," "system," "interface," and the like, are generally intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium associated with the machine. Such instructions, when executed by the machine, can cause the machine to perform the operations described. Additionally, the systems and processes can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD)); smart card(s); and flash memory device(s) (e.g., card, stick, key drive); and/or a virtual device that emulates a storage device and/or any of the above computer-readable media.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," and similar terminology refer to a wireless device at least one of (1) utilized by a subscriber or user of a wireless communication service to receive and/or convey data associated with voice, video, sound, and/or substantially any data-stream or signaling-stream; or (2) utilized by a subscriber of a voice over internet protocol (VoIP) service that delivers voice communications over internet protocol (IP) networks such as the Internet or other packet-switched networks. Further, the foregoing terms are utilized interchangeably in the subject specification and related drawings.

A communication network for systems described herein can include any suitable mobile- and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further, examples of a communication network can include any suitable data packet-switched or combination data packet/circuit-switched communication network, wired or wireless IP network such as a VoIP network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device for systems, methods, and/or apparatus disclosed herein can include a wireless communication device, a mobile device, a mobile phone, a PSTN phone, a cellular communication device, a cellular phone, a satellite communication device, a satellite phone, a VoIP phone, a wireless fidelity (WiFi) phone, a dual-mode cellular/WiFi phone, a combination cellular/VoIP/WiFi/Worldwide Interoperability for Microwave Access (WiMAX) phone, a portable computer, or any suitable combination thereof. Specific examples of a mobile device can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof. To provide support for a mobile device, a gateway routing component can include any suitable component that can perform centralized routing within a mobile, satellite, or similar network (but optionally need not include components that route strictly within a PSTN network), routing between communication networks, between networks of varying architecture (e.g., between PSTN, GSM, UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such a system can include any suitable device, process, and/or combination device that can store digital and/or switched information (e.g., server, data store component, data store component, or the like).

Now referring to FIG. 1, a communication environment 100 that facilitates voice call messaging within a threaded messaging setting is illustrated, in accordance with various embodiments described herein. In an aspect, communication environment 100 can include communication devices 102, 104 communicatively coupled to core network 106. Communication device 102 and/or communication device 104 can include software, hardware, functionality, and/or structure(s) of communication device 200 described below (and vice versa). In another aspect, communication device 102 can include a messaging component 108 and an interface component 110 for integrating visual voicemail within threaded messaging at communication device 102. In various aspects, messaging component 108 can integrate a visual voicemail, a voice note, multimedia content, an SMS message, an MMS message, etc. within one or more threaded messaging functions and/or protocols. Further, interface component 110 can be communicatively coupled to messaging component 108 for providing and/or enabling communication to/from communication device 102; for accessing and/or storing information within communication device 102; for controlling communication device 102; and/or for providing/receiving information input/output to/from communication device 102, e.g., for facilitating integration of the visual voicemail, the voice note, the multimedia content, the SMS message, the MMS message, etc. within a threaded communication environment via messaging component 108.

In various aspects, core network 106 can include software and/or hardware configured to provide connectivity, e.g., wired, wireless, etc. to/from/between communication devices 102, 104. Communication environment 100 can include one or more: macro, Femto, or pico access points (APs) (not shown); base stations (BS) (not shown); landline networks (e.g., optical landline networks, electrical landline networks) (not shown) communicatively coupled between communication devices 102, 104 and/or core network 106 to provide connectivity between communication devices 102, 104 and core network 106. In various embodiments, communication devices 102, 104 can communicate via any number of various types of wireless technologies including, but not limited to, cellular, WiFi, WiMax, wireless local area networks (WLAN), Femto, etc. In corresponding embodiments, core network 106 can provide cellular, WiFi, WiMAX, WLAN, and/or other technologies for facilitating such communication. Further, core network 106 can include one or more of the Internet (or another communication network (e.g., IP-based network)), or a digital subscriber line (DSL)-type or broadband network facilitated by Ethernet or other technology.

Core network 106 can also include short message service (SMS) networks and multimedia message service (MMS) networks. Further, core network 106 can include routers, nodes, switches, interfaces, and/or controllers that can facilitate communication of data to/from communication devices 102, 104. Furthermore, core network 106 can transmit and receive voice communication(s), voicemail, voice note(s), visual voicemail(s), system message(s), and/or text communication(s) (e.g., MMS messages, SMS messages, email messages, instant messages) to/from communication devices 102, 104. Further, core network 106 can transmit and receive graphics; pictures; video; audio; data traffic (e.g., user-opted notifications including, but not limited to, traffic reports, news alerts, weather information, stock reports); social networking chats (or chat message(s)); social networking posts (or social networking message(s)); and/or social networking status update(s) to and from communication devices 102, 104. While only communication devices 102 and 104 are shown, in various embodiments, core network 106 can include, or can be communicatively coupled to, other communication devices inside or outside of communication environment 100. In various embodiments, communication environment 100 can include hardware and/or software for allocating resources to communication devices 102, 104, e.g., converting or enforcing protocols, establishing and/or providing levels of Quality of Service (QoS), providing applications or services via core network 106, translating signals, and/or performing other desired functions to facilitate system interoperability and communication to or from communication devices 102, 104.

In various embodiments, core network 106 can include, or can be communicatively coupled to, one or more of multimedia servers (not shown), email servers (not shown), data store components (not shown), and/or the Internet (not shown) for communicating to/from communication devices 102, 104 at least one of: text (e.g., MMS message(s), SMS message(s), email message(s), instant message(s)); data; picture(s); audio; multimedia; voice, video; voicemail; visual voicemail; voice note(s); system message(s); data traffic (e.g., user-opted notification(s) including, but not limited to, traffic report(s), news alert(s), weather information, stock report(s)); social networking chat(s); social networking post(s); or social networking status update(s).

Core network 106 can also include data store component(s), memory configured to store information, and/or computer-readable storage media storing computer-executable instructions enabling various operations performed via communication devices 102, 104 and described herein. In some embodiments, core network 106 can include data store component(s), memory storing computer-executable instructions, and/or settings for integrating visual voicemail, voice note(s), multimedia, etc. within one or more threaded messaging functions and/or protocols within communication devices 102, 104. In some embodiments, the data store component(s) can store settings, and/or the memory can store computer-executable instructions for enabling communication devices 102, 104 to operate according to threaded messaging functions/operations as described in greater detail herein.

In some aspects, core network 106 can include rules and/or policies for threaded messaging in accordance with embodiments disclosed herein. In some embodiments, threaded messages of the threaded messaging can include threaded multi-modal, or heterogeneous, messaging content, e.g., a conversation thread, a threaded conversation, etc. that can be included in a unified inbox, e.g., associated with a cloud-based communication environment, a social media environment, a conversational space, a social network, etc. Such messaging content can include, but is not limited to: an SMS message, an MMS message, an email message, a voice call, a video call, a voicemail, a visual voicemail, a voice note, text, audio, a digital image/photo, a message, or any other type of data and/or voice traffic that can be transmitted from or received at communication devices 102, 104. For example, system messages, text (e.g., MMS messages, SMS messages, email messages, instant messages), pictures, video, audio, data traffic (e.g., user-opted notifications including, but not limited to, traffic reports, news alerts, weather information, stock reports), social networking chats, social networking posts, social networking status updates, visual voicemail, voice notes, etc. can be transmitted from or received at communication devices 102, 104.

In various aspects, communication devices 102, 104 can be mobile, wireless, wireline, and/or optical devices. Further, communication devices 102, 104 can include, but are not limited to, a mobile or cellular telephone including, but not limited to, a smartphone, a BLUETOOTH® enabled device, a 3GPP UMTS phone, a 4G cellular communication device, a personal digital assistant (PDA), computer, IP television (IPTV), a wireline phone with mobile messaging functionality, a gaming console, a set top box (STB), a multimedia recorder, a multimedia player, a video recorder, a video player, an audio recorder, an audio player, a laptop, a printer, a copier, or a scanner.

In various embodiments, communication devices 102, 104 can include hardware and/or software facilitating operation according to one or more communication protocols described above with reference to core network 106, or the functionality facilitated by the hardware and/or software described above with reference to core network 106. The one or more communication protocols and/or the functionality can include, but is not limited to, MMS, SMS, WLAN, WiFi, WiMAX, BLUETOOTH® protocol, text messaging, electronic mail messaging, facsimile, multimedia and/or any number of other protocols or functionalities as described herein with reference to the communications protocols or functionalities facilitated by core network 106. In various embodiments, communication devices 102, 104 can include hardware and/or software to facilitate transmitting and/or receiving heterogeneous messaging traffic, e.g., which can include voice, text, digital pictures, video, audio, data traffic, visual voicemail, voice note(s), etc. Further, the hardware and/or software can facilitate threading the heterogeneous messaging traffic, via respective displays associated with communication devices 102, 104, according to an order that information associated with the heterogeneous messaging traffic is received by communication devices 102, 104.

Figure 2:
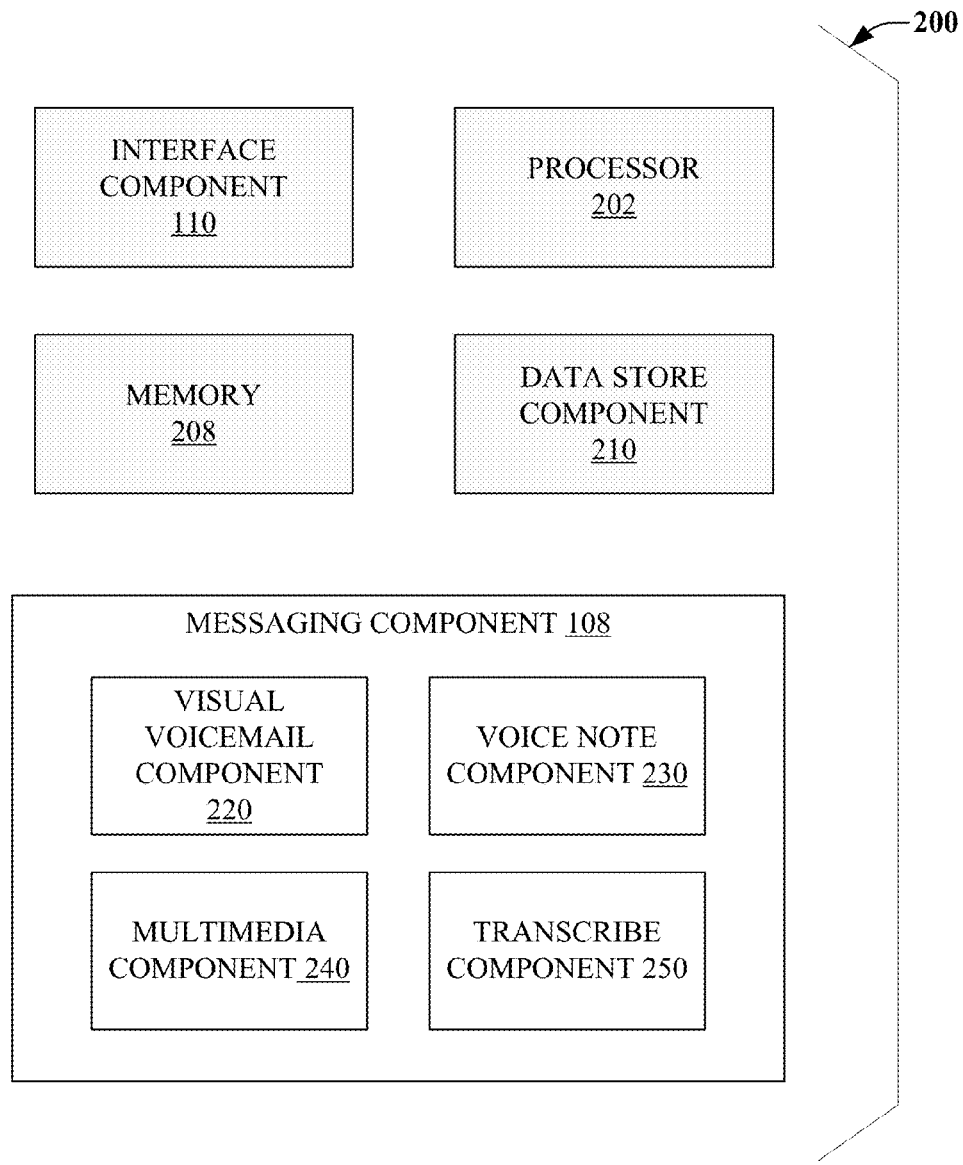
FIG. 2 illustrates a block diagram of a communication device, in accordance with various embodiments described herein.

Referring now to FIG. 2, a block diagram of a communication device 200 is illustrated, in accordance with various embodiments. Communication device 200 can include software, hardware, functionality, component(s), and/or structure(s) of communication device 102 and/or communication device 104 (and vice versa). Further, one or more components of communication device 200 can be communicatively coupled to one another to perform the functions of communication device 200 described herein.

In an aspect, communication device 200 can include messaging component 108, interface component 110, processor 202, memory 208, and data store component 210.

Interface component 110 can include hardware and/or software facilitating receipt and/or output of heterogeneous messaging content at and/or from communication device 200. Further, interface component 110 can facilitate detection of threading information in response to a threading of the messaging content being performed without communication device 200, e.g., the threading of the messaging content being performed via component(s) of core network 106. The receipt and transmission of messaging content and/or threading information can be utilized to provide multi-modal messaging at communication device 200.

In an aspect, interface component 110 can include hardware and/or software facilitating display of information via one or more displays of communication device 200. For example, interface component 110 can facilitate display of one or more conversations. In some embodiments, the one or more conversations can include messaging content that is heterogeneous, or multi-modal, including, e.g., voice content, an SMS message, an MMS message, an email message, an instant message, a voicemail, a visual voicemail, a voice note, a system message, a digital image, video, audio, data traffic (e.g., user-opted notifications including, but not limited to, traffic report(s), news alert(s), weather information, stock report(s)), social networking chat(s) (or chat message(s)), social networking post(s)/message(s), social networking status update message(s), etc. Further, interface component 110 can be configured to control a user interface (UI) (not shown) of communication device 200, e.g., to display the messaging content in a single thread at communication device 200; to receive input for creating at least a portion of the messaging content, etc.

The UI can include any number of different types of user interfaces including, but not limited to, a graphical user interface (GUI), a touch-sensitive interface (e.g., a touch screen), an interface having capability for receiving audio input (and outputting audio information) and the like. In some embodiments described herein, the UI can include a touch screen configured to receive inputs at the touch screen and graphically output, from the touch screen, information for multi-modal messaging, or heterogeneous messaging, including, e.g., a conversation thread, a threaded conversation, etc. The UI can be enabled to display alpha and/or numeric characters, message balloons, images, icons and the like for the heterogeneous messaging. For example, the UI can display the display regions described in more detail below, and illustrated by FIGS. 5-9.

Processor 202 can be configured to facilitate operations performed by one or more components of communication device 200, e.g., processor 202 can be included in, or communicatively coupled to, hardware and/or software of the one or more components, e.g., messaging component 108, of communication device 200 to facilitate integrating heterogeneous messaging content, e.g., visual voice mail, voice note(s), multimedia content, MMS message(s), SMS message(s), etc. within a thread of messaging content, e.g., conversation thread, etc. In some embodiments, processing for integrating such content can be initiated upon receiving such content at messaging component 108.

Memory 208 and/or data store component 210 can be configured to store information, settings, and/or computer-executable instructions for performing one or more operations and/or functions described herein associated with communication device 200. In various embodiments, as described below with reference to method 300 of FIG. 3, data store component 210 can be a conversations data store component that can store information including, but not limited to, received messaging content, timestamp information, timestamps, messaging content details, conversation identification(s), and the like in a data store.

In various embodiments, data store component 210 can store data structure(s) (e.g., user data, application data, metadata); code structure(s) (e.g., modules, objects, classes, procedures); instructions; message hashes; neighbor cell lists; and/or display information, e.g., heterogeneous messaging content, associated with a UI display screen.

In an aspect, processor 206 can be functionally coupled, e.g., through a memory bus, to data store component 210 for: storing and retrieving information, e.g., neighbor cell list, information relating to securing communication device 200, other associated information, etc.; displaying information, e.g., heterogeneous messaging content, in the UI display screen; generating or displaying an overlay display region associated with the UI display screen; generating or processing notifications and associated notification-related information, e.g., frequency offsets, desired algorithms, etc. related to operating and/or conferring functionality to various components and/or operational aspects of communication device 200 including, e.g., messaging component 108, interface component 110, etc.

In various embodiments, messaging component 108 can implement one or more messaging protocols as described herein with reference to methods 300-400; messaging screen 500; display regions 600, 700; messaging content 800; and/or display 900.

Figure 3:
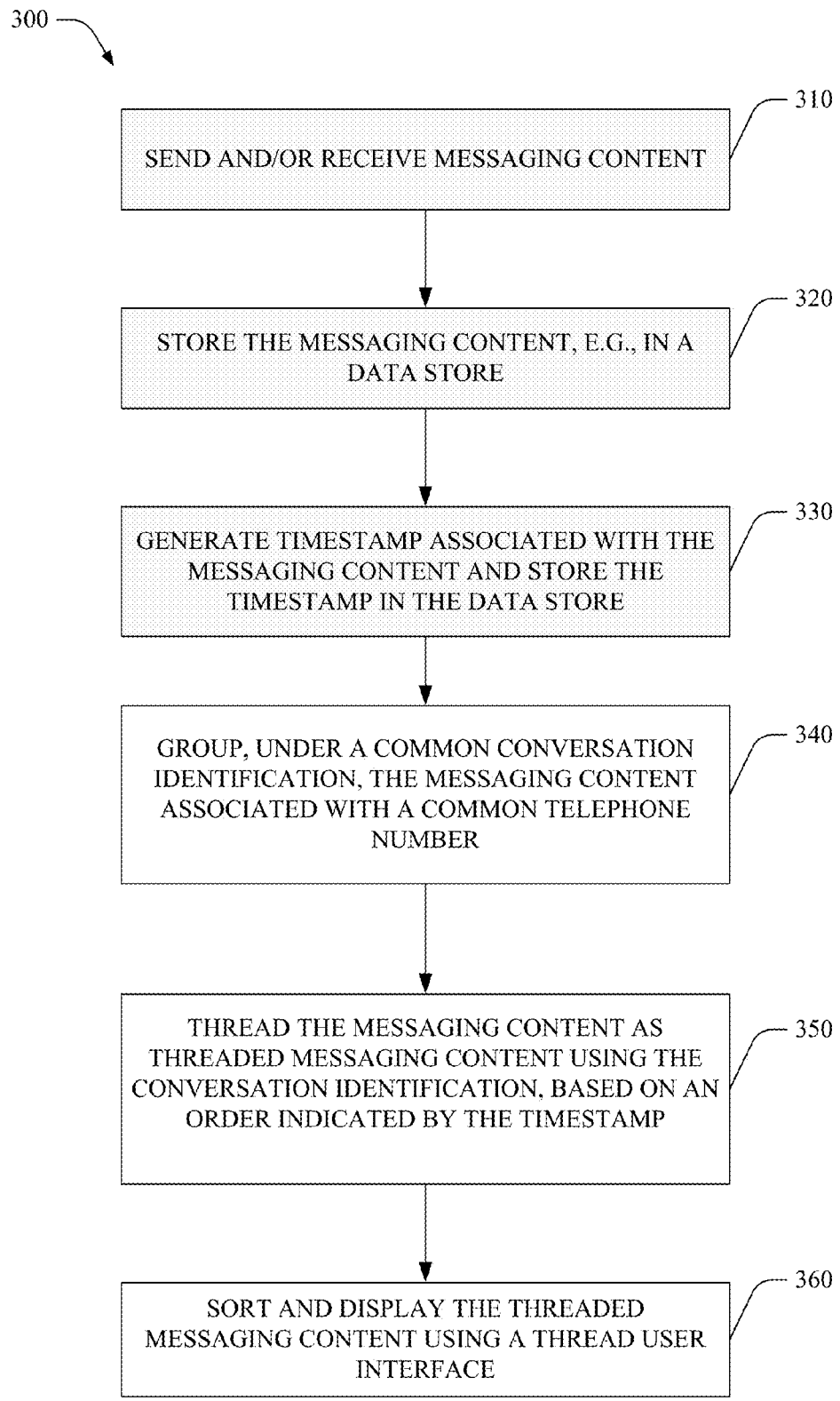
FIGS. 3 and 4 illustrate flowcharts of exemplary methods for integrating visual voicemail within a threaded communication environment, in accordance with aspects described herein.

Referring now to FIG. 3, a method 300 for integrating heterogeneous messaging content, e.g., visual voicemail, voice note(s), multimedia, SMS message(s), MMS message(s), etc. within a threaded communication environment are illustrated, in accordance with various embodiments. At 310, messaging content, or heterogeneous message content, can be received, created, communicated, etc. (e.g., via messaging component 210). For example, system messages, text (e.g., MMS messages, SMS messages, email messages, instant messages), pictures, video, audio, data traffic (e.g., user-opted notifications including, but not limited to, traffic reports, news alerts, weather information, stock reports), social networking chats, social networking posts, social networking status updates, visual voicemail, voice notes, etc. can be received at and/or communicated by communication device 200.

In an example, such messaging content can include an incoming/outgoing SMS notification, an incoming/outgoing MMS notification, and/or an incoming/outgoing call notification, e.g., when a phone call associated with a telephone number of communication device 200 is being initiated, e.g., via core network 106.

At 320, the messaging content can be stored, e.g., via data store component 210, in a data store. In an aspect, data store component 210 and/or the data store can be located remote from communication device 200, but communicatively coupled to communication device 200.

At 330, a timestamp can be identified and/or generated based on a time that the message content is received at and/or communicated by communication device 200. Further, the timestamp can be stored in the data store. At 340, messaging content, messaging details, other information associated with the messaging content, etc. can be grouped under, associated with, etc. a common conversation identification (ID). In some embodiments, the messaging content can be associated with a conversation and a common telephone number. For example, the messages content can be grouped in parent/child relationships based on whether messages are replies to respective other messages.

At 350, the messaging content, e.g., calls, messages, multimedia content, etc. can be threaded based on the conversation ID and an order indicated by the timestamp, e.g., associated with a time the messaging content is received at and/or communicated by communication device 200.

In an aspect, data store component 210 can perform queries to fetch the messaging content, e.g., entries, from the data store for a single conversation thread, in sorted order, based on respective timestamps. For example, data store component 210 can perform SQLite queries to fetch and sort messaging content to obtain sorted messaging content based on the respective timestamps. As such, messaging content associated with the common telephone number can be sorted and displayed in a conversation thread based on the respective timestamps, or based on an order the message content is received at and/or communicated by communication device 200.

At 360, the sorted messaging content can be sorted via a thread UI (not shown), and displayed via communication device 200, e.g., a list of messages and/or phone calls associated with the conversation ID can be provided to the UI for display of the conversation based on the order message content is sent and/or received. In an aspect, most recently sent and/or received messaging content can be displayed at the bottom of the thread UI.

Now referring to FIG. 2, messaging component 108 can include a visual voicemail component 220 that can be configured to process voicemails associated with respective phone calls directed to or received at communication device 200. For example, visual voicemail component 220 can process, create, store, etc. a visual voicemail, or information associated with the visual voicemail, e.g., a timestamp, etc. in response to a voicemail and/or a phone call that is directed to a telephone number associated with communication device 200.

In an aspect, visual voicemail component 220 can determine whether the voicemail, or the phone call, is being initiated. As such, visual voicemail component 220 can receive (and/or create) and display a visual voicemail within the thread UI. In an aspect, the visual voicemail can be displayed within the thread UI as a symbol, an icon, a pop-up window, etc. In one aspect, visual voicemail component 220 can display text within a pop-up window of the thread UI that is associated with the visual voicemail. The text can indicate a name of a person initiating the phone call and a status of the voicemail, e.g., whether the person is leaving a voice message, a duration of the voice message, a notification of whether the person initiating the phone call is listening to a greeting, leaving a message, etc. In another aspect, visual voicemail component 220 can display one or more selectable UI elements, which are associated with the visual voicemail, for joining (or intercepting) the phone call, listening to the voice message as it is being left, etc.

In yet another aspect, visual voicemail component 220 can detect, via interface component 110, a selection of an element of the one or more selectable UI elements that are associated with the visual voicemail. Further, visual voicemail component 220 can perform an operation associated with the selection, e.g., intercept, or join the phone call while the voicemail is being recorded; listen to the voicemail while it is being recorded, etc. As such, interface component 110 can generate audio associated with the phone call, voicemail, etc. in response to the selection.

In another aspect illustrated by FIG. 2, messaging component 108 can include a voice note component 230 that can be configured to receive and/or create a voice note. The voice note can include a recorded message that can be transmitted to/from communication device 200 without initiating a phone call. In an aspect, voice note component 230 can be configured, via interface component 110, to record, re-record, send, delete, play, etc. the recorded message. Further, voice note component 230 can enable preview of the recorded message before sending, broadcasting, etc. the voice note in a one-to-one conversation mode, a broadcast conversation mode, or a group conversation mode (see below).

In an aspect, voice note component 230 can receive (and/or create) and display the voice note within the thread UI. In one aspect, the voice note can be displayed within the thread UI as a symbol, an icon, a pop-up window, etc. In another aspect, voice note component 230 can display text within a pop-up window of the thread UI. The text can indicate a name of a person who recorded the voice note, a duration of a recorded message associated with the voice note, etc.

In yet another aspect, voice note component 230 can display one or more selectable UI elements for listening to, recording, previewing, re-recording, sending, or deleting the voice note. Further, voice note component 230 can detect, via interface component 110, a selection of an element of the one or more selectable UI elements. Further, voice note component 230 can perform an operation associated with the selection, e.g., listen to, record, preview, re-record, send, delete, etc. the voice note. Furthermore, interface component 110 can generate audio associated with the voice note in response to the selection.

In another aspect illustrated by FIG. 2, messaging component 108 can include a multimedia component 240 that can be configured to receive multimedia content, e.g., an image, a video, music, etc. and display a representation of such content within the thread UI. In an aspect, the representation of the multimedia content can be displayed within the thread UI as a symbol, an icon, etc.

In one aspect, multimedia component 240 can display one or more selectable UI elements for reviewing the multimedia content. Further, multimedia component 240 can detect, via interface component 110, a selection of an element of the one or more selectable UI elements. Further, multimedia component 240 can perform an operation, via interface component 110, based on the selection, e.g., generate sound, generate image(s), preview a recording, a preview a video, etc.

In one aspect illustrated by FIG. 2, messaging component 108 can include a transcribe component 250 that can be configured to receive and/or generate a transcription of a visual voicemail, a voice note, a text message, etc. via transcription software, natural language speech recognition technique(s), etc.

Further, transcribe component 250 can display, via interface component 110, the transcription as text within the thread UI. For example, the txt can be displayed within the thread UI within a pop-up window of the thread UI. In an aspect, the text can indicate a name of a person associated with the visual voicemail, the voice note, the text message, etc. and a duration of the visual voicemail, the voice note, etc.

Figure 4:
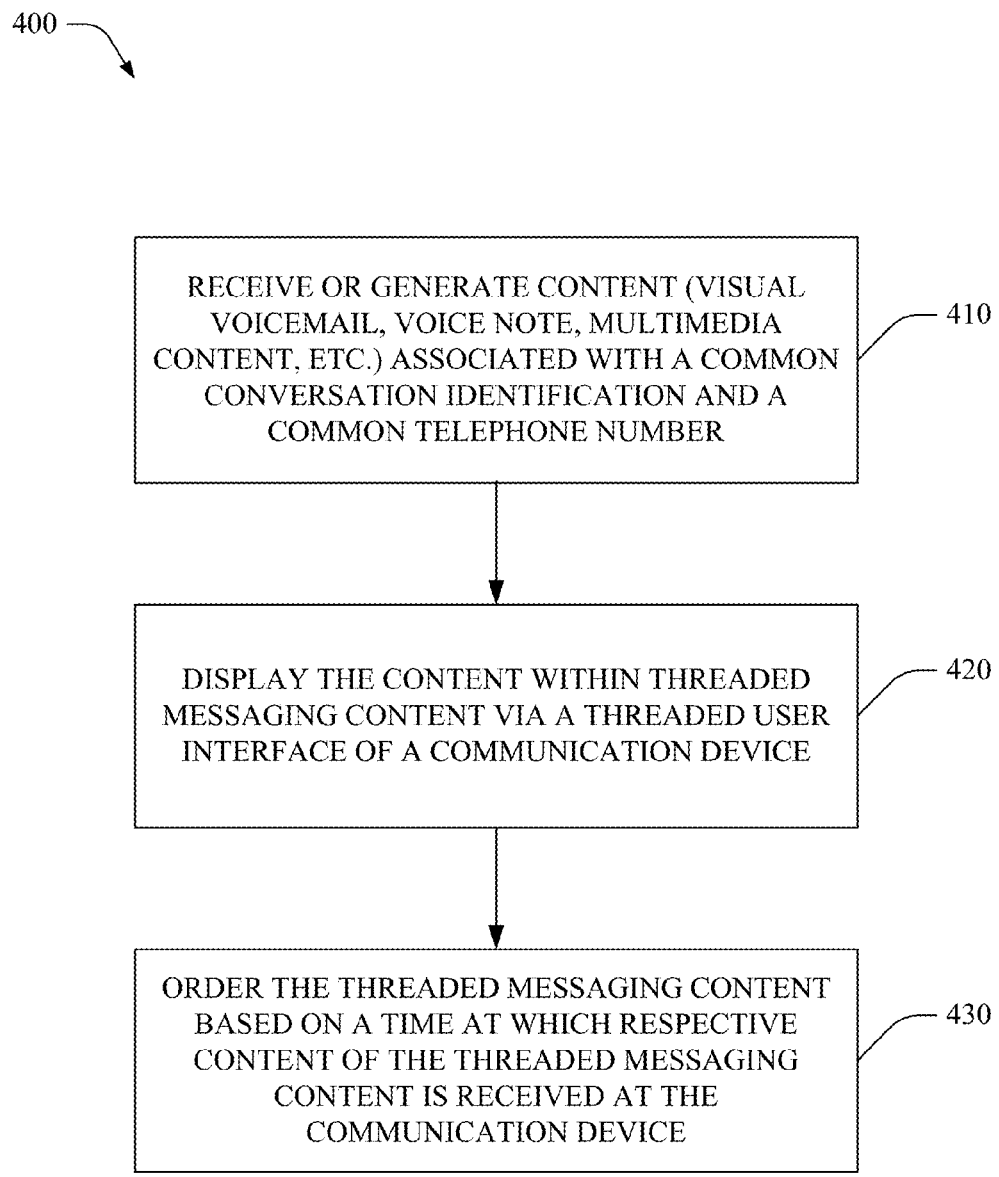

Referring now to FIG. 4, a method 400 for integrating a visual voicemail, a voice note, multimedia content, etc. within a threaded communication environment is illustrated, in accordance with an embodiment. At 410, the visual voicemail, the voice note, the multimedia content, etc., which can be associated with a common conversation ID and a common telephone number, can be received, generated, sent, etc. At 420, the visual voicemail, the voice note, a representation of the multimedia content, etc. can be displayed as respective content of the threaded messaging content, e.g., heterogeneous messaging content, via a threaded UI of communication device 200. At 430, the threaded messaging content can be ordered based on a time at which the respective content of the threaded messaging content is received at, or communicated by, communication device 200. In an aspect (not shown), the time at which the respective content is received/communicated can be determined and timestamps can be associated with the respective content, prior to ordering of the threaded messaging content.

In another aspect, displaying the threaded messaging content can include displaying a portion of the threaded messaging content in a first region of a screen of communication device 200, and displaying another portion of the threaded messaging content in a second region of the screen. For example, with reference to FIG. 5, sent messages can be displayed on a left portion of a display region of UI 510 and received messages can be on a right portion of the display region (and vice versa). In other embodiments, the sent and received messages can be provided on a top or bottom portion of the display region.

Figure 5:
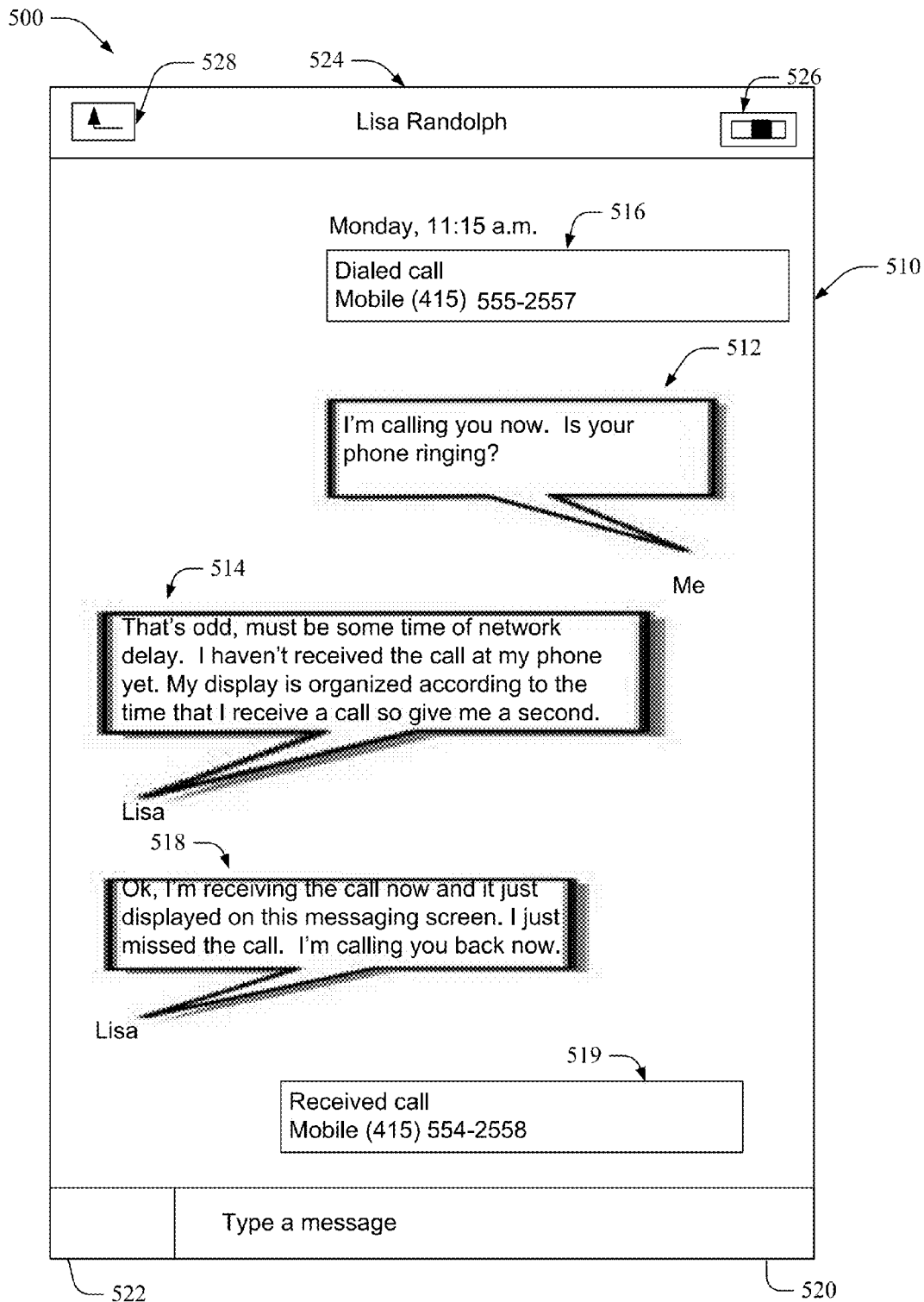
FIGS. 5-10 illustrate display content of user interfaces of communication devices integrating visual voicemail within a threaded communication environment, in accordance with aspects described herein.

FIG. 5 illustrates a block diagram of a display region 510 of a UI providing a messaging screen 500 that facilitates threaded messaging for a selected entity in accordance with aspects described herein. The threaded messaging can be a conversation, which can include one or more telephone calls (e.g., voice calls, video calls, visual voicemails), MMS messages, email messages, instant messages, SMS messages, voice notes, multimedia, etc. grouped by common recipients. A conversation can be associated with a unique set of recipients. In various embodiments, the conversation can also include, but is not limited to, system messages, text (e.g., MMS messages, SMS messages, email messages, instant messages), pictures, video, audio, data traffic (e.g., user-opted notifications including, but not limited to, traffic reports, news alerts, weather information, stock reports), social networking chats, social networking posts, social networking status updates, voice notes, etc.

In various embodiments, the recipient and transmission mode can be a one-to-one conversation mode, a group conversation mode, or a broadcast conversation mode. The group and broadcast conversation modes can be enabled, and message recipients selected, via interface component 110 of communication device 200.

In one-to-one conversation mode, a message can be transmitted, by a sender, to one recipient. As noted, a message can include, but is not limited to, telephone calls (e.g., voice calls, video calls), MMS messages, email messages, instant messages and/or SMS messages, voicemail, visual voicemail, voice notes, system messages, text, pictorial, audio, data traffic (e.g., user-opted notifications including, but not limited to, traffic reports, news alerts, weather information, stock reports), social networking chats, social networking posts and/or social networking status updates. The one-to-one conversation mode employs SMS transmission unless media is attached to the message, in which case an MMS message is used.

In broadcast conversation mode, a message and/or voice call can be transmitted, by a sender, to more than one recipient. Each recipient can view only the sender's messages and/or voice calls. In the absence of media, messages can be transmitted over SMS.

In group conversation mode, a message can transmitted between two or more recipients and a sender, with all recipients seeing all messages to and from other recipients. Regardless of whether media is attached, all messages are transmitted over MMS with addresses populating the cc field. In a group conversation, the conversation can illustrate messages and/or calls threaded for a group of recipients. The recipients can be noted on the communication device screen and any message or call sent or received from or to anyone in the group can be displayed in the conversation.

A message can represent a call, a visual voicemail, a voice note, an SMS message, an MMS message, etc. The recipient can be a user of communication device 200 sending or receiving the call, the visual voicemail, the voice note, the SMS message, the MMS message, etc. The recipient's information can be linked with the recipient's contact data if an entry for the recipient exists in contacts information, e.g., stored on communication device 200, or accessible by communication device 200.

Messaging screen 500 can provide a display area (or region) 510, which can display messaging content 512, 514, 516, 518, 519 to or from an individual or a group; indicia 524 identifying the individual or the group; a button 528 for displaying one or more conversations; and a button 526 for selecting whether a contacts screen, a social media screen, or a conversation screen is displayed. Further, display area 510 can also include a text box 520 for entering text to send to another user, and a button 522, or region of display area 510, which can be depressed or otherwise activated to send the message after the message has been typed into text box 520.

Messaging content 512, 514, 516, 518, 519 can compose a conversation history displayed in display area 510. The conversation history can be a chronological history of sent and received messaging content. The sent and received messaging content can include sent and/or received telephone (or video) calls, visual voicemails, text, non-telephone call messages (e.g., voice notes), MMS messages, email messages, instant messages, SMS messages, multimedia, system messages, etc. grouped by common recipients. Most recently sent and/or received event or messaging content can appear at the bottom of the list.

Figure 6:
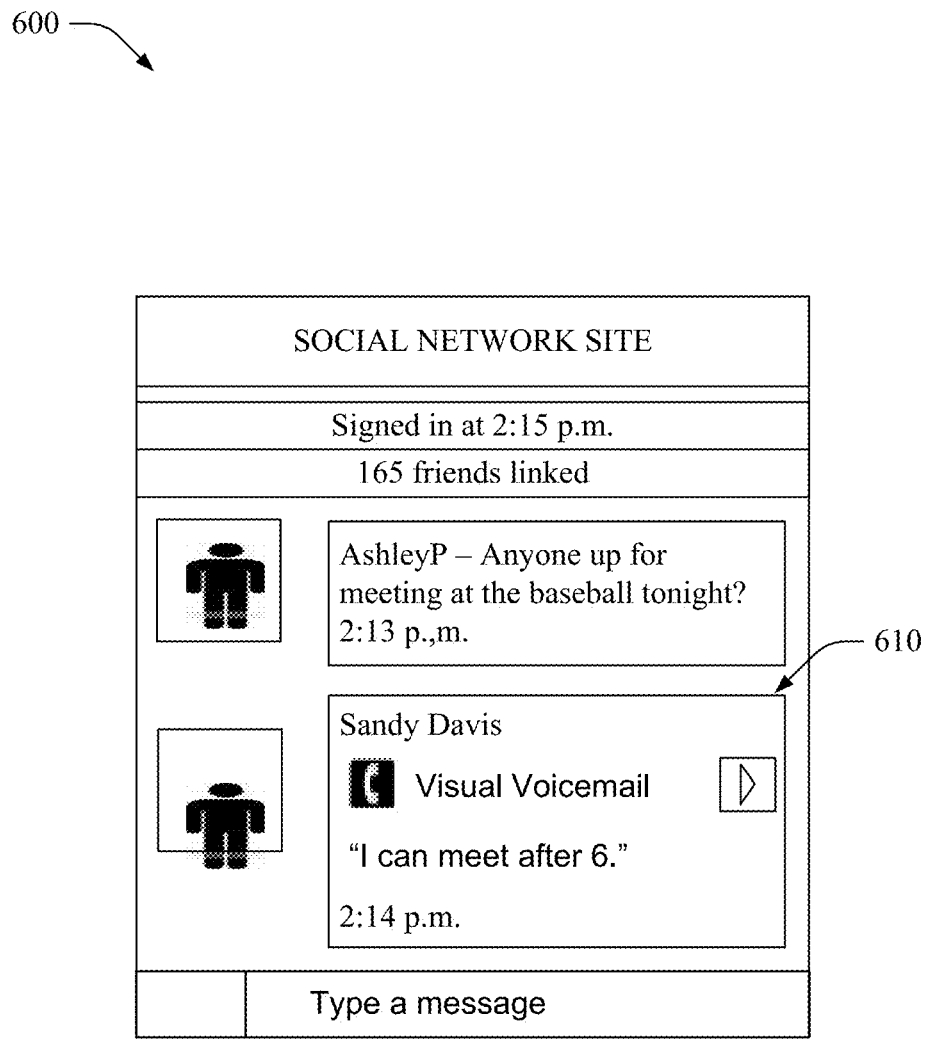

In one embodiment illustrated by FIG. 6, the conversation history can be integrated, embedded, etc. within a display region 600 of a social media based interface in accordance with aspects described herein. Display region 600 displays information indicative of social media information associated with a social network site (SNS), e.g., a FACEBOOK® SNS, including SNS contacts who have usernames "AshleyP" and "Sandy Davis" that are linked to contacts accessible by communication device 200. Further, display region 600 illustrates integrating, embedding, etc. a visual voicemail 610 (see e.g. 810 below) within the social media based interface. In other aspects, the SNS can be a MYSPACE® SNS, a LINKEDIN® SNS, a MYLIFE® SNS, or the like.

In other embodiments, the list position of messages can be preserved after a call detail or a message detail overlay is displayed on the UI. The call detail or the message detail can be information about a telephone call or other messaging content in the conversation list. The call detail and the message detail can include information such as the author of the messaging content, the duration of a call, the time of a call or other messaging content received by the recipient and/or any error notifications regarding the call or other messaging content. In some embodiments, communication device 200 can display the call detail or the message detail in response to communication device 200 detecting an associated call, or other messaging content being selected (e.g., depressed, activated) for a predetermined amount of time.

In some embodiments, the indicia 524 identifying the individual or the group can be a contact name stored in the contacts of the communication device 200.

In various embodiments, messaging content 512, 514, 516, 518, 519 can be provided, displayed, etc. in bubbles or other visual indicia of a respective individual or group that communicated, sent, transmitted, etc. such messaging content. Further, messaging content 512, 514, 516, 518, 519 can be organized in chronological order, by a time at which such content was sent and/or received at communication device 200.

Messaging content 512, 514, 516, 518, 519 can include, but is not limited to, textual, graphical, video, voice, and/or pictorial information. The messaging content can be indicative of a telephone call (such as that shown at 516, 519), a text message (such as that shown at 512, 514, 518), an email message, a picture message, multimedia content, a visual voicemail, a voice note, or otherwise. As such, the messaging content can include audio files/data and/or links to websites or the audio files/data. As illustrated by FIG. 5, the messaging content is heterogeneously composed of different types of messages displayed in display area 510. As such, different types of messages, including but not limited to, indicia indicating incoming, ongoing or missed telephone calls, visual voicemail(s), voice note(s), etc. can be displayed with text messages, email messages, picture messages, website links, and the like.

In some embodiments, display area 510 can display sent and received messages between a user of communication device 200 and a contact (or entity representing a plurality of people, such as an organization, or the like). In some embodiments, the sent messaging content can be displayed on one side of display area 510 and the received messaging content can be displayed on the other side of display area 510. In one embodiment, received messaging content is displayed on the left side of the display area 510 and sent messaging content, e.g., associated with the user of communication device 200, is displayed on the right side of the display area 510.

Figure 7:
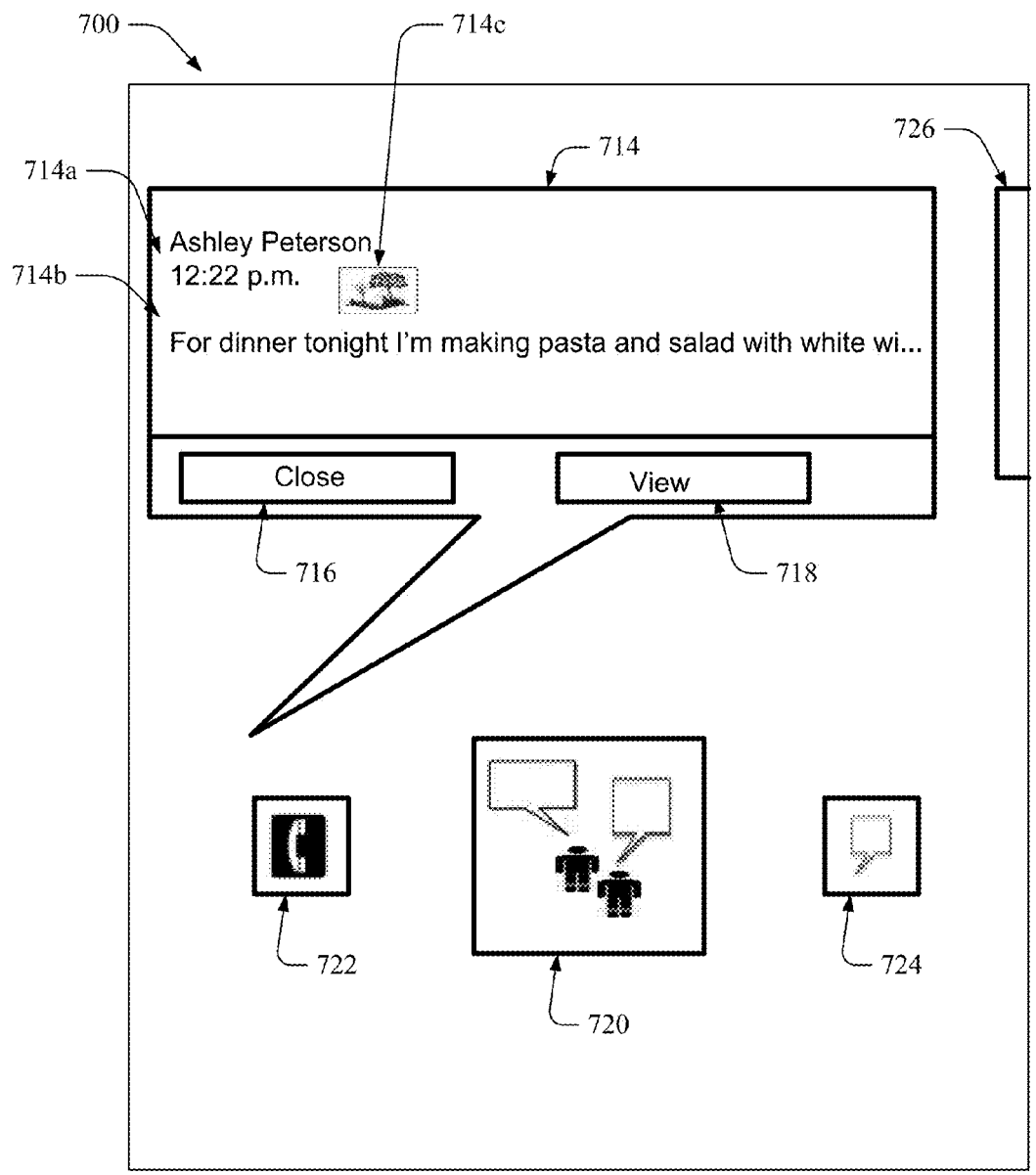

Now referring to an embodiment illustrated by FIG. 7, messaging content 714 can be threaded (in a thread) with messaging content 726, which can be the next messaging content. For example, messaging content 714 can be threaded by displaying such content in a chronological order of messaging content 714 being received and/or sent via communication device 200, e.g., as threaded messaging content, a conversation thread, as a threaded conversation, etc. In an aspect, the chronological order can be determined by a timestamp associated with a time respective messaging content 714 is send from and/or received at communication device 200. In one aspect, the timestamp can be associated with the respective messaging content 714 prior to ordering of the threaded messaging content.

In another aspect, the thread can be displayed in a horizontal fashion as illustrated by FIG. 7. The most recent messaging content can be displayed in display region 700 while the next messaging content 726 in the thread can be partially displayed in display region 700. In an aspect, swiping left and right can display threaded messaging content in chronological order of receipt at the communication device 200.

In an aspect, messaging content 714 can include messaging details 714a indicative of a sender of a message and a time that the message was received, e.g., at communication device 200. Messaging content 714 can also include a message 714b (or portion thereof) and/or multimedia 714c associated with the messaging content 714. Icon 714c can change in appearance based on a type of multimedia content attached to/included in messaging content 714.

Display region 700 can also display buttons or icons 716, 718 that can be activated by a user of communication device 200, e.g., via interface component 110, for example, to close a notification of the messaging content; to close a pop-up screen; to view the entirety of the messaging content; to record messaging content and/or audio associated with, e.g., a visual voicemail, a voice note, etc.; to join a phone call, e.g., associated with a visual voicemail; to play audio associated with a visual voicemail and/or a voice note; to review multimedia content, e.g., a video; to record multimedia content, etc. While messaging content 714 is displayed with only a portion of message 714b showing, in some embodiments (not shown) the sender's name and/or any other information included in the messaging content can be abbreviated. Thus, the button or icon 718 can be activated to display the entirety of such abbreviated information.

In other aspect(s) illustrated by FIG. 7, display region 700 can display icons 722, 720, 724 indicative of the type of information displayed in the messaging content, notification, etc. For example, a threaded messaging icon 720 can appear in an enlarged fashion relative to icons 722, 724 to indicate that the notification, e.g., messaging content 714, displays information about threaded messaging. Further, icon 722 can indicate that the notification displays information about a phone call, a visual voicemail, a voice note, etc. Furthermore, icon 724 can indicate the notification displays information about received messaging content (or vice versa).

Figure 8:
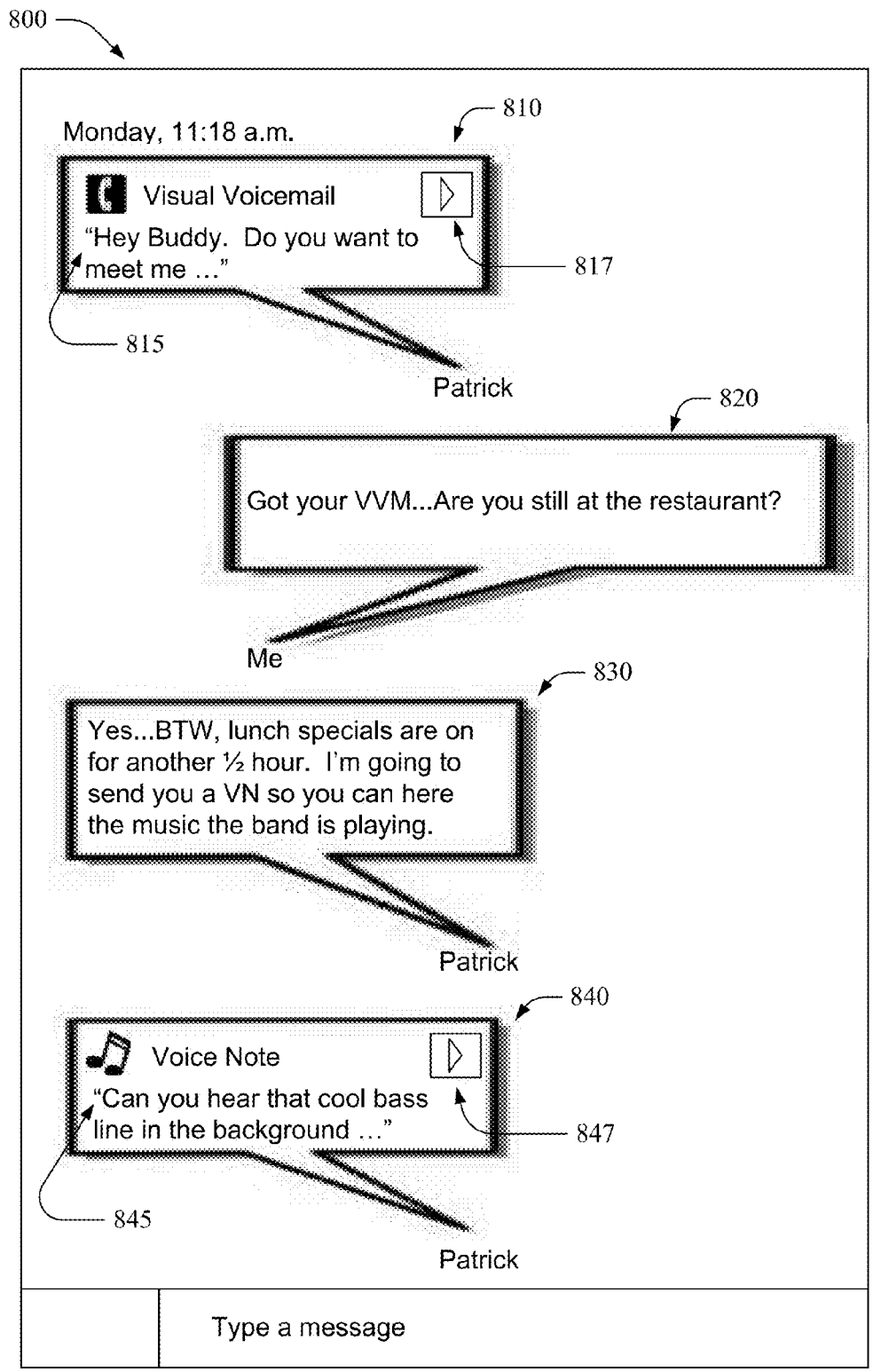

Referring now to FIG. 8, threading messaging content of display region 800 including a visual voicemail (vvm) 810, text messages 820 and 830, and a voice note (vn) 840 is illustrated, in accordance with an embodiment. Most recent messaging content that is sent or received, e.g., voice note 840, can be displayed at the bottom of the threaded messaging content. Visual voicemail 810 can include message details including, e.g., a transcription 815 of a recorded message of visual voicemail 810, e.g., made via transcribe component 250; a sender (not shown) of visual voicemail 810; a time (not shown) that visual voicemail 810 was directed to communication device 200 or received at communication device 200; a duration (not shown) of the recorded message, etc. Further, visual voicemail 810 can include an icon or display button 817 that can be activated by a user of communication device 200, e.g., via interface component 110, to play audio associated with the recorded message.

Voice note 840 can include message details including, e.g., a transcription 845 of a recorded message of voice note 840, e.g., made via transcribe component 250. Further, voice note 840 can include an icon 847 that can be activated by a user of communication device, e.g., via interface component 110, to play audio associated with the recorded message of voice note 840.

Figure 9:
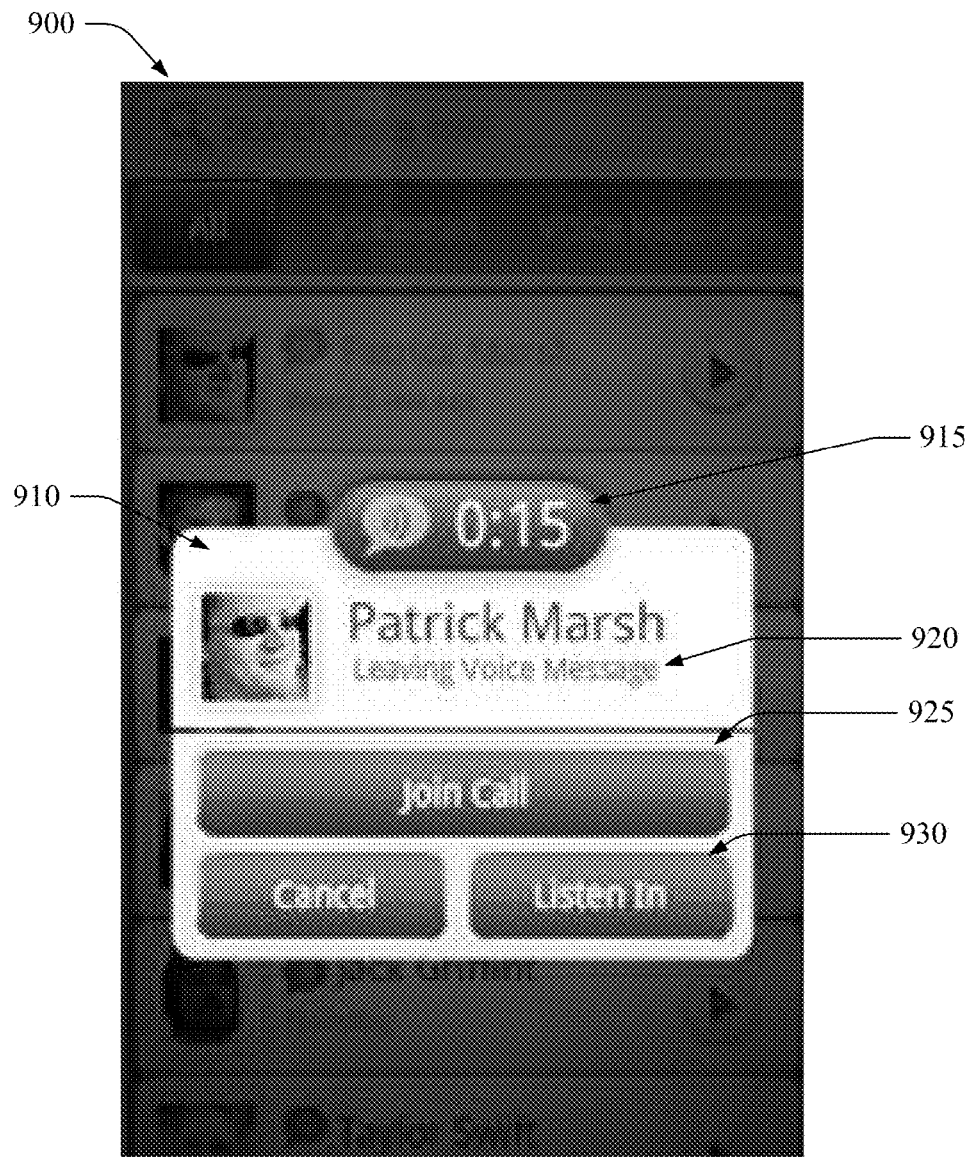

In an embodiment illustrated by FIG. 9, messaging content 900 can include visual voice mail 910, which can include message details 915, 920. Message detail 915 indicates duration of a visual voice mail 910 in progress, e.g., as it is being recorded during a phone call directed to a telephone number associated with communication device 200. Message detail 920 indicates a status of visual voicemail 910, e.g., the caller, sender, etc. is leaving/recording a message of visual voicemail 910; the caller, sender, etc. is listening to a greeting. Visual voicemail 910 can also include icon/display buttons 925, 930. Icon 925 can be activated by a user of communication device 200, e.g., via interface component 110, to join, or intercept, the phone call, e.g., while the message of visual voicemail 910 is being recorded. Icon 930 can be activated by the user to listen to, or screen, the message of visual voicemail 910 while it is being recorded. Further, icon 925 can enable the user to "pick up" the phone call during screening of the message.

Figure 10:
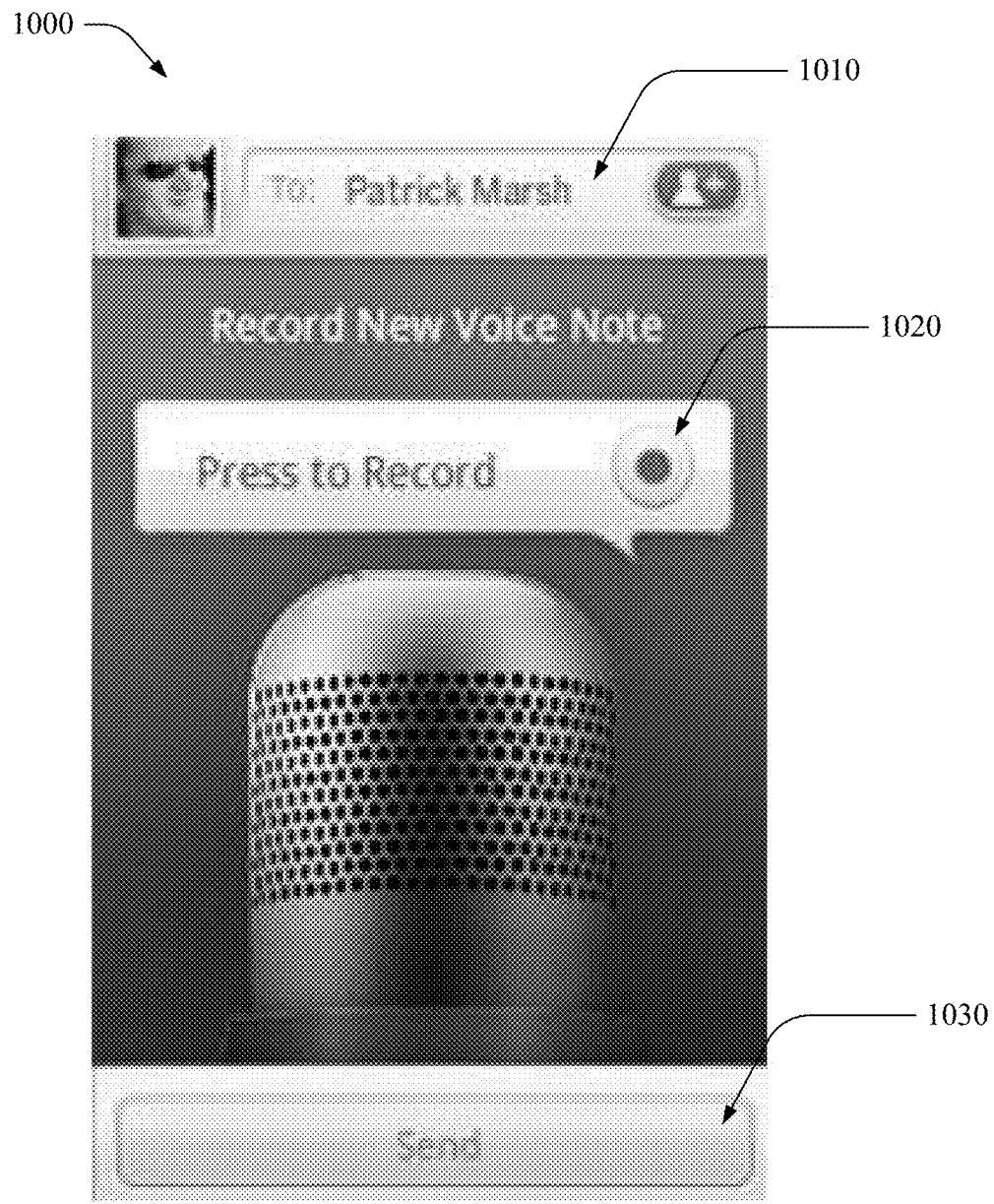

In an embodiment illustrated by FIG. 10, a display 1000 for initiating a voice note is illustrated, in accordance with an embodiment. As described above, messaging component 108 can include a voice note component 230 that can be configured to receive and/or create a voice note. The voice note can include a recorded message that can be transmitted to/from communication device 200 without initiating a phone call. In an aspect, display 1000 illustrates voice note component 230 displaying, via interface component 110, voice note recipient entry region 1010, which enables the user of communication device 200 to select a recipient and/or group(s) for receiving the voice note within threaded messaging content associated with the recipient and/or groups(s) and the user. Further, display 1000 illustrates voice note component 230 displaying selectable icon/display buttons 1020, 1030 for recording and sending the voice note, respectively.

Figure 11:
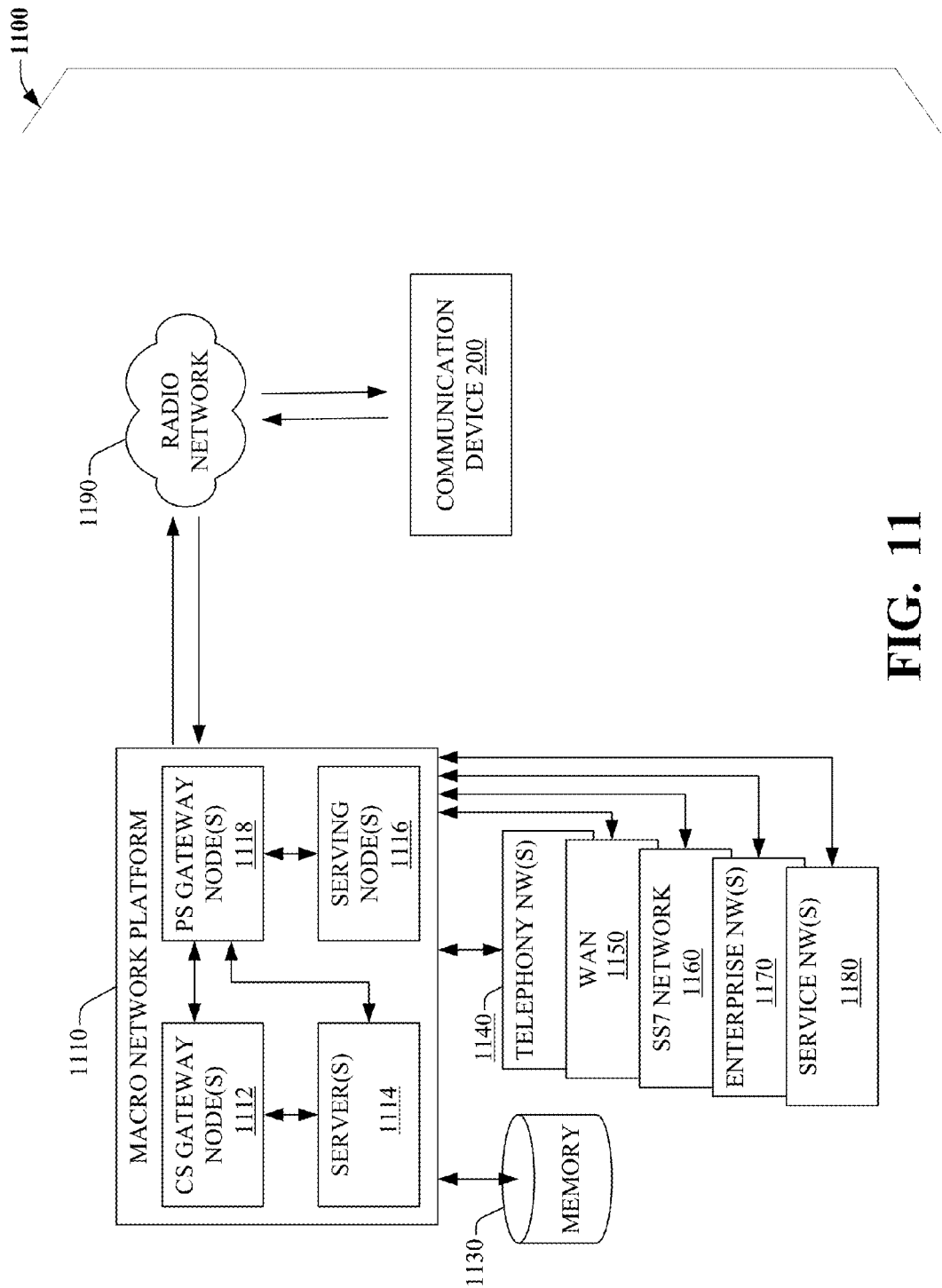
FIG. 11 illustrates a wireless communication environment, in accordance with aspects described herein.

With respect to FIG. 11, a wireless communication environment 1100 including communication device 200 and macro network platform 1110 is illustrated, in accordance with an embodiment. Macro network platform 1110 serves or facilitates communication with communication device 200 via radio network 1190. It should be appreciated that in cellular wireless technologies that can be associated with radio network 1190 (e.g., 3GPP UMTS, HSPA, 3GPP LTE, 3GPP2 UMB), macro network platform 1110 is embodied in a core network. It is noted that radio network 1190 can include base station(s), base transceiver station(s), or access point(s), and associated electronic circuitry and deployment site(s), in addition to a wireless radio link operated in accordance with the base station(s). Accordingly, radio network 1190 can comprise various coverage cells, or wireless coverage areas. In addition, it should be appreciated that elements and/or components of communication device 200 can be located/included within one or more components/elements, e.g., hardware, software, etc., of wireless communication environment 1100, e.g., macro network platform 1110, radio network 1190, etc.

Generally, macro platform 1110 includes components, e.g., nodes, gateways, interfaces, servers, or platforms that facilitate both packet-switched (PS), e.g., internet protocol (IP), frame relay, asynchronous transfer mode (ATM), and circuit-switched (CS) traffic, e.g., voice and data, and control generation for networked wireless communication, e.g., via communication device 200. In an aspect of the subject innovation, macro network platform 1110 includes CS gateway node(s) 1112 which can interface CS traffic received from legacy networks like telephony network(s) 1140, e.g., public switched telephone network (PSTN), or public land mobile network (PLMN), or a SS7 network 1160. Circuit switched gateway 1112 can authorize and authenticate traffic, e.g., voice, arising from such networks. Additionally, CS gateway 1112 can access mobility or roaming data generated through SS7 network 1160; for instance, mobility data stored in a visitor location register (VLR), which can reside in memory 1130. Moreover, CS gateway node(s) 1112 interfaces CS-based traffic and signaling and gateway node(s) 1118. As an example, in a 3GPP UMTS network, PS gateway node(s) 1118 can be embodied in gateway GPRS support node(s) (GGSN).

In addition to receiving and processing CS-switched traffic and signaling, PS gateway node(s) 1118 can authorize and authenticate PS-based data sessions with served, e.g., through macro RAN, wireless devices. Data sessions can include traffic exchange with networks external to the macro network platform 1110, like wide area network(s) (WANs) 1150; enterprise networks (NWs) 1170, e.g., enhanced 911, or service NW(s) 1180 like IP multimedia subsystem (IMS). It should be appreciated that local area network(s) (LANs), which may be a part of enterprise NW(s), can also be interfaced with macro network platform 1110 through PS gateway node(s) 1118. Packet-switched gateway node(s) 1118 generates packet data contexts when a data session is established. To that end, in an aspect, PS gateway node(s) 1118 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1114. It is to be noted that in 3GPP UMTS network(s), PS gateway node(s) 1118 (e.g., GGSN) and tunnel interface (e.g., TTG) comprise a packet data gateway (PDG).

Macro network platform 1110 also includes serving node (s) 1116 that can convey the various packetized flows of information, or data streams, received through PS gateway node(s) 1118. As an example, in a 3GPP UMTS network, serving node(s) can be embodied in serving GPRS support node(s) (SGSN).

As indicated above, server(s) 1114 in macro network platform 1110 can execute numerous applications, e.g., location services, online gaming, wireless banking, wireless device management, etc. that can generate multiple disparate packetized data streams or flows; and can manage such flows, e.g., schedule, queue, format. Such application(s), for example can include add-on features to standard services provided by macro network platform 1110. Data streams can be conveyed to PS gateway node(s) 1118 for authorization/authentication and initiation of a data session, and to serving node(s) 1116 for communication thereafter. Server(s) 1114 can also effect security, e.g., implement one or more firewalls, of macro network platform 1110 to ensure network's operation and data integrity in addition to authorization and authentication procedures that CS gateway node(s) 1112 and PS gateway node(s) 1118 can enact. Moreover, server(s) 1114 can provision services from external network(s), e.g., WAN 1150, or Global Positioning System (GPS) network(s), which can be a part of enterprise NW(s) 1180. It is to be noted that server(s) 1114 can include one or more processors configured to confer at least in part the functionality of macro network platform 1110. To that end, the one or more processors can execute code instructions stored in memory 1130, for example.

In example wireless communication environment 1100, memory 1130 stores information, e.g., a usage history (see above), related to operation of macro network platform 1110. Information can include business data associated with subscribers; market plans and strategies, e.g., promotional campaigns, business partnerships; operational data for mobile devices served through macro network platform; service and privacy policies; end-user service logs for law enforcement; and so forth. Memory 1130 can also store information from at least one of telephony network(s) 1140, WAN 1150, SS7 network 1160, enterprise NW(s) 1170, or service NW(s) 1180.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 1130, non-volatile memory 1222 (see below), disk storage 1224 (see below), and/or memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
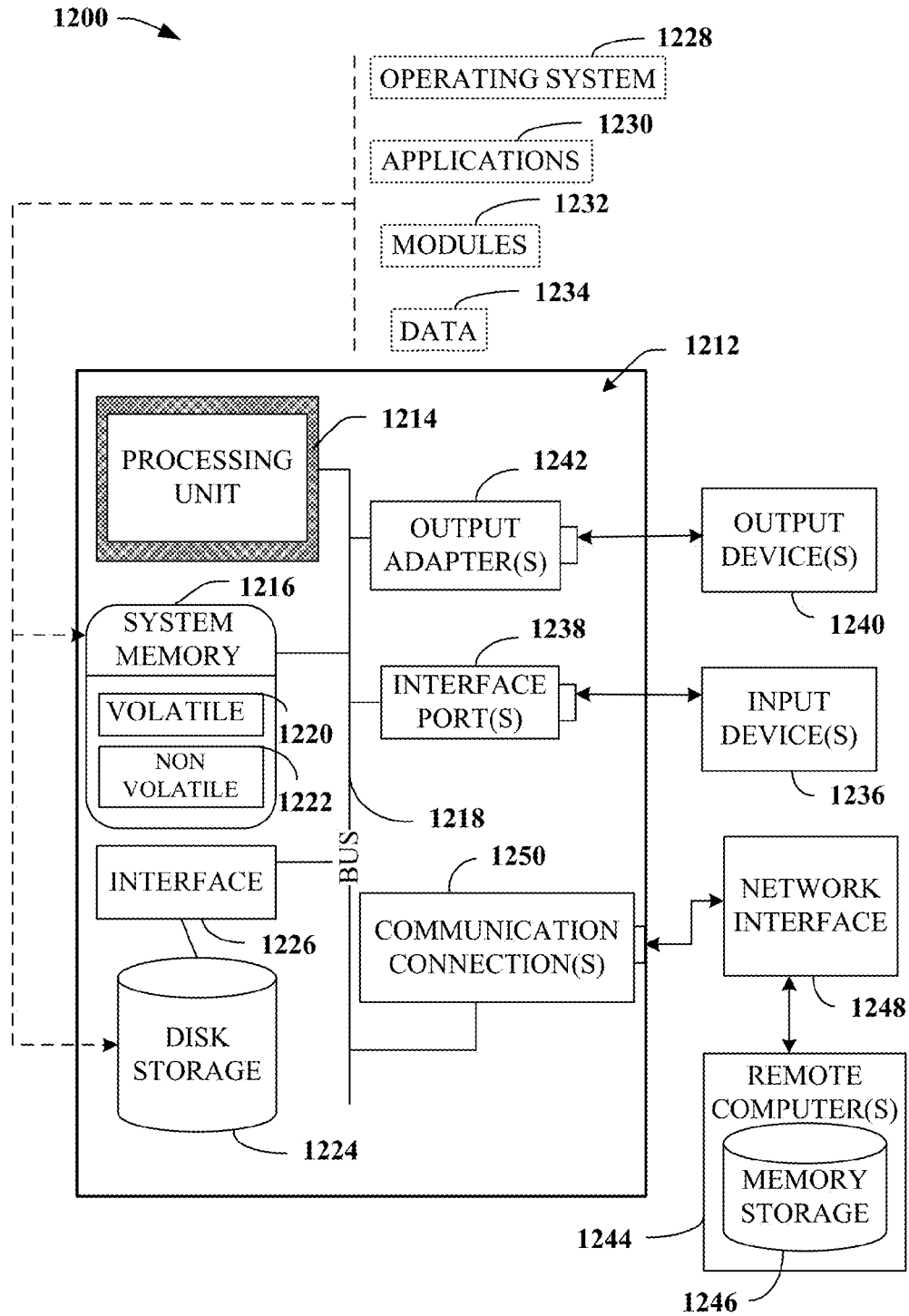
FIG. 12 illustrates a block diagram of a computing system operable to execute the disclosed methods and apparatus, in accordance with aspects described herein.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information, e.g., via interface component 830, into computer 1211 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1214 through system bus 1218 via interface port(s) 1238. Interface port(s) 1238 include, for example, a serial port, a parallel port, a game port, and a universal serial bus (USB). Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The computer 1212 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 710 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and BLUETOOTH® wireless technologies. Thus, the communication can be a predefined structure as with a conventional network or simply an ad hoc communication between at least two devices.

WiFi allows connection to the Internet from a desired location (e.g., couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    displaying, by a system comprising a processor, a thread of messaging content via an interface of the system;
    receiving, by the system, a visual voicemail associated with a call;

integrating, by the system, a display of the visual voicemail within the thread of messaging content; and in response to detecting, via the interface, an activation of an icon of the visual voicemail that has been presented within the display of the visual voicemail, intercepting, by the system, the call during a recording of the visual voicemail.

2. The method of claim 1, further comprising:
in response to receiving an input via the interface, generating, by the system, sound based on a communication included in the visual voicemail.

3. The method of claim 1, wherein the integrating comprises integrating the display of the visual voicemail within a multi-modal conversation thread.

4. The method of claim 1, wherein the integrating comprises integrating the display of the visual voicemail within an instant messaging window comprising a message service message.

5. The method of claim 1, wherein the integrating comprises embedding the display of the visual voicemail within a social media based interface.

6. The method of claim 1, further comprising:
receiving, by the system, multimedia content; and
integrating, by the system, a multimedia display of the multimedia content within the thread of messaging content.

7. The method of claim 1, wherein the receiving the visual voicemail comprises:
receiving a transcription of the visual voicemail; and
displaying the transcription of the visual voicemail within the thread of messaging content.

8. The method of claim 1, further comprising:
displaying, by the system, an indication that the visual voicemail has been initiated.

9. The method of claim 8, wherein the intercepting comprises joining the call.

10. The method of claim 1, further comprising:
recording, by the system via the interface, sound to obtain another visual voicemail; and
integrating, by the system, another display of the other visual voicemail within the thread of messaging content.

11. The method of claim 1, further comprising:
receiving, by the system, a voice note; and
integrating, by the system, another display of the voice note within the thread of messaging content.

12. The method of claim 11, further comprising:
in response to receiving an input via the interface, generating, by the system, sound based on a communication included in the voice note.

13. The method of claim 11, wherein the receiving the voice note comprises:
receiving a transcription of the voice note; and
displaying the transcription of the voice note within the thread of messaging content.

14. The method of claim 1, further comprising:
recording, by the system via the interface, sound to obtain a voice note;
sending, by the system, the voice note to a recipient; and
integrating, by the system, another display of the voice note within the thread of messaging content.

15. A computer readable storage device comprising executable instructions that, in response to execution, cause a computing device comprising a processor to perform operations, comprising:
displaying a threaded conversation;
receiving a visual voicemail corresponding to a call;
displaying a representation of the visual voicemail comprising an icon in the threaded conversation;
in response to detecting a selection of the icon, intercepting the call during a recording of the visual voicemail.

16. The computer readable storage device of claim 15, wherein the operations further comprise:
generating, based on a first input, sound information to be rendered as a sound based on a message included in the visual voicemail.

17. The computer readable storage device of claim 15, wherein the
intercepting comprises joining the call.

18. A system, comprising:
a memory to store executable instructions; and
a processor, coupled to the memory, that facilitates execution of the executable instructions to perform operations, comprising:
displaying a conversation thread;
receiving a visual voicemail;
displaying a representation of the visual voicemail within the conversation thread, wherein the representation comprises an icon; and
in response to detecting a selection of the icon, intercepting the call during a recording of the visual voicemail.

19. The system of claim 18, wherein the operations further comprise:
in response to detecting a second selection, generating audio based on the call.

20. The system of claim 18, wherein the intercepting comprises joining the call.

* * * * *